(12) United States Patent
Giacomin

(10) Patent No.: US 8,146,396 B2
(45) Date of Patent: Apr. 3, 2012

(54) LOCKING CYLINDER FOR A MOTOR VEHICLE

(75) Inventor: Fabrice Giacomin, Creteil Cedex (FR)

(73) Assignee: Valeo Securite Habitacle, Créteil Cedex (FR)

( * ) Notice: Subject to any disclaimer, the term of this patent is extended or adjusted under 35 U.S.C. 154(b) by 244 days.

(21) Appl. No.: 12/447,829

(22) PCT Filed: Oct. 16, 2007

(86) PCT No.: PCT/EP2007/061044
§ 371 (c)(1),
(2), (4) Date: Apr. 29, 2009

(87) PCT Pub. No.: WO2008/052882
PCT Pub. Date: May 8, 2008

(65) Prior Publication Data
US 2010/0000275 A1    Jan. 7, 2010

(30) Foreign Application Priority Data
Oct. 30, 2006   (FR) .................................... 06 09530

(51) Int. Cl.
*E05B 17/00* (2006.01)
(52) U.S. Cl. ................ 70/441; 70/186; 70/252; 70/248; 70/239

(58) Field of Classification Search .............. 70/239, 70/248, 254, 255, DIG. 30, 441, 182–186, 70/252
See application file for complete search history.

(56) References Cited

U.S. PATENT DOCUMENTS

| 2,105,350 | A | * | 1/1938 | Fitz Gerald | 70/264 |
| 2,215,162 | A | * | 9/1940 | Scott | 200/43.08 |
| 2,623,959 | A | * | 12/1952 | Jarrett | 200/43.04 |
| 3,410,123 | A | * | 11/1968 | Jacobi | 70/495 |
| 3,520,161 | A | * | 7/1970 | Jacobi | 70/387 |
| 3,650,131 | A | * | 3/1972 | Eichenauer | 70/252 |
| 3,661,000 | A | * | 5/1972 | Kerr | 70/388 |
| 3,748,881 | A | * | 7/1973 | Erickson | 70/388 |

(Continued)

FOREIGN PATENT DOCUMENTS
DE       93 20 270 U1    5/1994
(Continued)

OTHER PUBLICATIONS

International Search Report w/translation from PCT/EP2007/061044 dated Jan. 31, 2008 (4 pages).

(Continued)

*Primary Examiner* — Suzanne Barrett
(74) *Attorney, Agent, or Firm* — Osha Liang LLP

(57) ABSTRACT

The invention relates to a locking cylinder with a longitudinal housing, said housing containing a control sensor for triggering an electrical switch for detection of introduction of a key into the cylinder, said sensor being slideably mounted parallel to the axis (A) of introduction of the key, the front end section of the sensor, which may be pushed by the key, cooperates with the housing means to form a ramp to cause a displacement of said front end section in a direction inclined with relation to the axis (A) between a lower idle position and an upper trigger position in which the housing (2) further contains a switch trigger means, in contact with the rear end of the sensor, said trigger means being only able to move parallel to the axis (A).

7 Claims, 2 Drawing Sheets

U.S. PATENT DOCUMENTS

| | | | | |
|---|---|---|---|---|
| 3,826,116 A | * | 7/1974 | Messera et al. | 70/388 |
| 3,902,341 A | * | 9/1975 | Peitsmeier | 70/252 |
| 4,148,202 A | * | 4/1979 | Wegrzyn | 70/431 |
| 4,328,692 A | * | 5/1982 | Dice et al. | 70/421 |
| 4,414,830 A | * | 11/1983 | Maiocco | 70/252 |
| 5,457,973 A | * | 10/1995 | Grimmer et al. | 70/252 |
| 6,237,378 B1 | * | 5/2001 | Canard | 70/252 |
| 6,327,882 B1 | * | 12/2001 | Canard | 70/186 |
| 6,354,117 B1 | * | 3/2002 | Canard | 70/186 |
| 6,446,475 B1 | * | 9/2002 | Agnatovech et al. | 70/379 R |
| 6,568,230 B1 | * | 5/2003 | Chen | 70/419 |
| 6,756,698 B2 | * | 6/2004 | Shamoto et al. | 307/10.6 |
| 6,810,701 B2 | * | 11/2004 | Lee et al. | 70/186 |
| 7,673,483 B2 | * | 3/2010 | Flandrinck | 70/252 |

FOREIGN PATENT DOCUMENTS

FR     2 788 479 A1     7/2000

OTHER PUBLICATIONS

Written Opinion from PCT/EP2007/061044 dated Jan. 31, 2008 (6 pages).

\* cited by examiner

LOCKING CYLINDER FOR A MOTOR VEHICLE

The present invention relates to a lock plug and to an antitheft lock comprising such a plug, in particular a motor vehicle antitheft lock.

It applies typically, but not exclusively, to the field of antitheft devices having an electric switch for detecting the introduction of a key into a lock.

The document FR 2 788 479 provides an antitheft device comprising an electric switch used in combination with an electric circuit, the introduction of the key into the lock being detected in advance with a view to triggering for example the preheating of the engine as quickly as possible, in particular in the case of a diesel engine.

The switch is of the type having a control rod able to move under the action of a control sensor for the tripping of the switch, said sensor being mounted such that it can slide under the action of the key in a housing of the lock.

Said sensor, returned elastically into its rest position by elastic means of the electric switch, is in direct contact with the control rod of the switch.

The front end part of the sensor on which the key exerts pressure engages with a ramp arranged inside the plug. The ramp causes the front end part of the sensor to move in a direction inclined with respect to the axis of introduction of the key.

Said sensor thus moves between a low rest position and a high position, inclined with respect to this axis, in the introduction direction of the key.

When the sensor moves from the low position to the inclined high position, the rear end of the sensor exerts pressure on the control rod in order to trip the electric switch.

However, during the translation of the key in the plug, the constituent parts of the electric switch are subjected to premature wear due to the radial component of said pressure, as a result of the inclination of the sensor.

This is because said inclination places pressure having a longitudinal component and also a radial component on the control rod.

Moreover, the elastic return means of the sensor which are incorporated in the switch are not optimized to return the sensor into its initial position as the key is withdrawn.

The invention aims to solve the problems of the prior art by providing an antitheft device which improves the tripping of the electric switch by way of the sensor.

To this end, one subject of the invention is a plug comprising a longitudinal housing, said housing containing a control sensor intended to trip an electric switch for detecting the introduction of a key into the plug, said sensor being mounted such that it slides parallel to the axis of introduction of the key, the front end part of the sensor, which may have pressure exerted on it by the key, engaging with means of the housing that form a ramp in order to cause said front end part to move in a direction inclined with respect to the axis of introduction of the key between a low rest position and a high tripping position, the housing also containing a switch-tripping means abutting the rear end of the sensor, said tripping means being able to slide only parallel to the axis of introduction of the key.

By virtue of the invention, the premature wear of the electric switch caused by the radial pressure on the sensor, and also accidental jamming of the sensor both in its low rest position and in its high tripping position, are avoided.

According to one feature of the invention, the switch-tripping means comprises a fork preventing the rear end of the sensor from moving in a direction perpendicular to the axis of introduction of the key.

In one embodiment, the housing also contains a holding member which is able to hold the switch-tripping means inside said housing.

According to one particular example, the holding member is a cylindrical ring forming a bearing for the tripping means. This ring may also, for example, be square.

In another embodiment, the housing also contains a return member which is able to return the sensor to the low rest position when the key is withdrawn from the plug.

In a particularly advantageous manner, when the housing of the plug contains a holding member, the return member is interposed between an annular flange of the switch-tripping means and the holding member.

The plug can thus easily be integrated into a lock barrel of an antitheft device. In this type of lock, the electric switch, tripped by said tripping means, is of relatively simple design since it has neither a control rod nor elastic means.

In one particular example, when the tripping means is provided with a fork preventing the rear end of the sensor from moving in a direction perpendicular to the axis of introduction of the key, the sensor comprises a plate-shaped body which comprises a longitudinal slot able to engage with the fork when the sensor is in the high tripping position.

The longitudinal slot is designed to receive the fork, and as a result the sensor is not prevented from moving by the fork when the sensor is in the high position.

According to another aspect, the invention relates to an antitheft lock comprising a plug according to the invention.

Further features and advantages of the present invention will become apparent in the light of the following detailed description, with reference to the annotated drawings, said drawings being purely illustrative and nonlimiting.

FIG. 1 shows the main components of an illustrative embodiment of a motor vehicle lock plug 1 in accordance with the invention.

Figure 1:
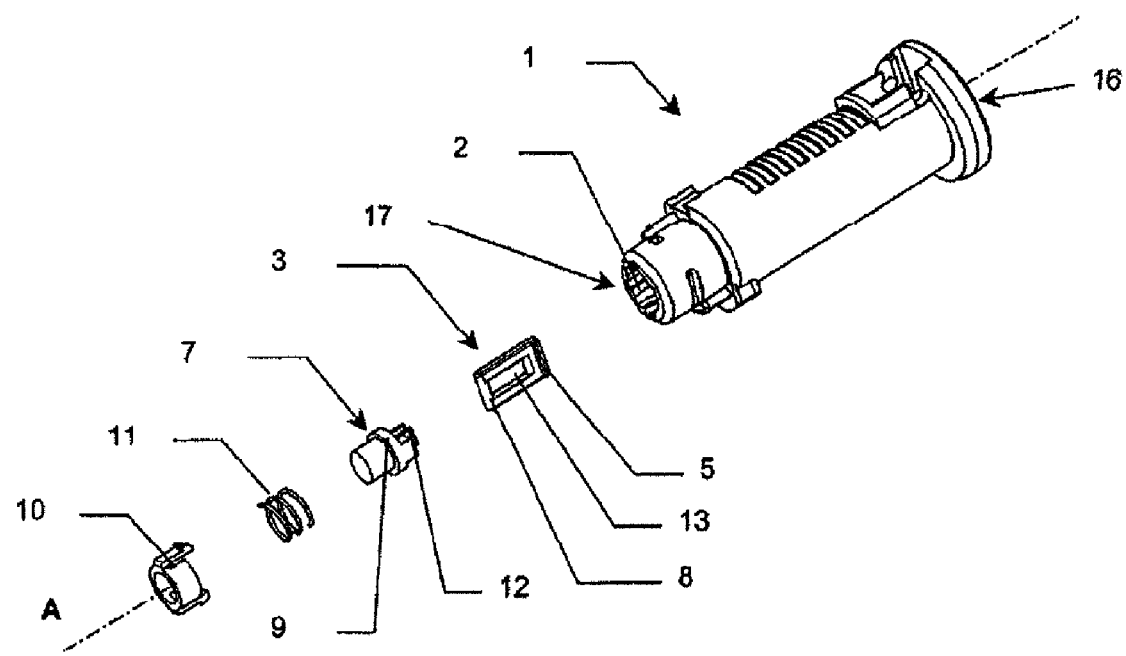
FIG. 1 shows an exploded view of a plug according to the invention.

The front face 16 of the plug 1 is defined as the entry face for a key and the rear face 17 of said plug represents the face close to an electric switch.

The plug 1 comprises a housing 2 in which a sensor 3, a switch-tripping means 7, a return member 11 and a holding member 10 are arranged.

The sensor 3 is a plate-shaped body comprising a longitudinal slot 13.

The front end 5 of the sensor 3 is in the form of a cylindrical transverse bar.

The tripping means 7 is a plug provided with an annular flange 9 and having at its front end a fork 12, said fork receiving the rear end 8 of the sensor 3.

The return member 11 is an elastic means of the helical spring type, for example. The spring 11 rests on the annular flange 9, the tripping means 7 nesting inside the spring 11.

Finally, the holding member 10 is a cylindrical ring, the internal cross section of which is larger than the cross section of the cylindrical tripping means 7.

Figure 2:
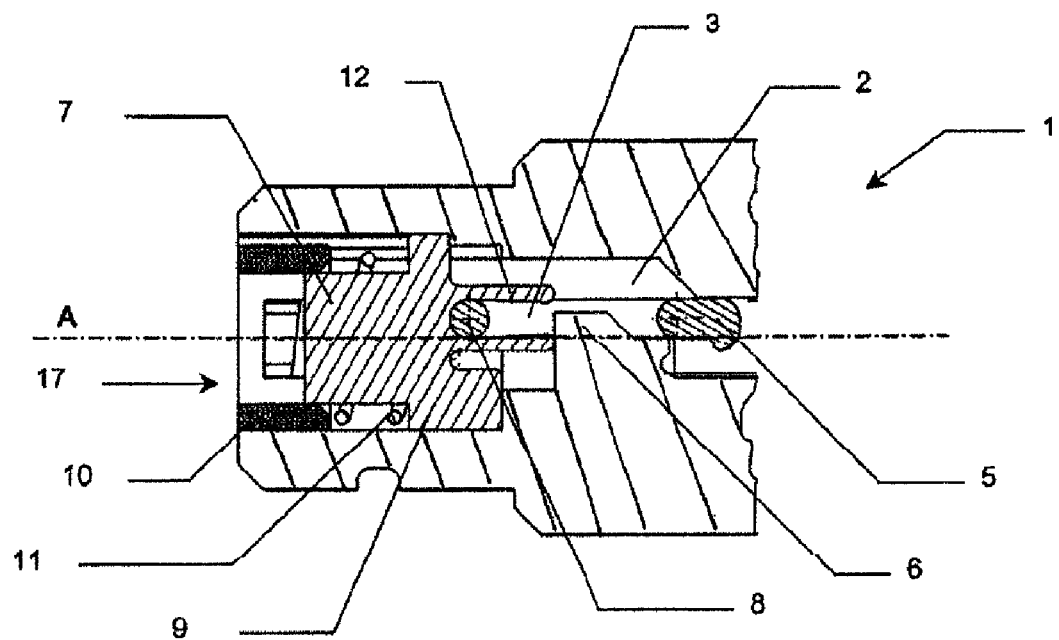
FIG. 2 shows a partial view in longitudinal section of a plug according to the invention when the sensor is in the low rest position.
Figure 3:
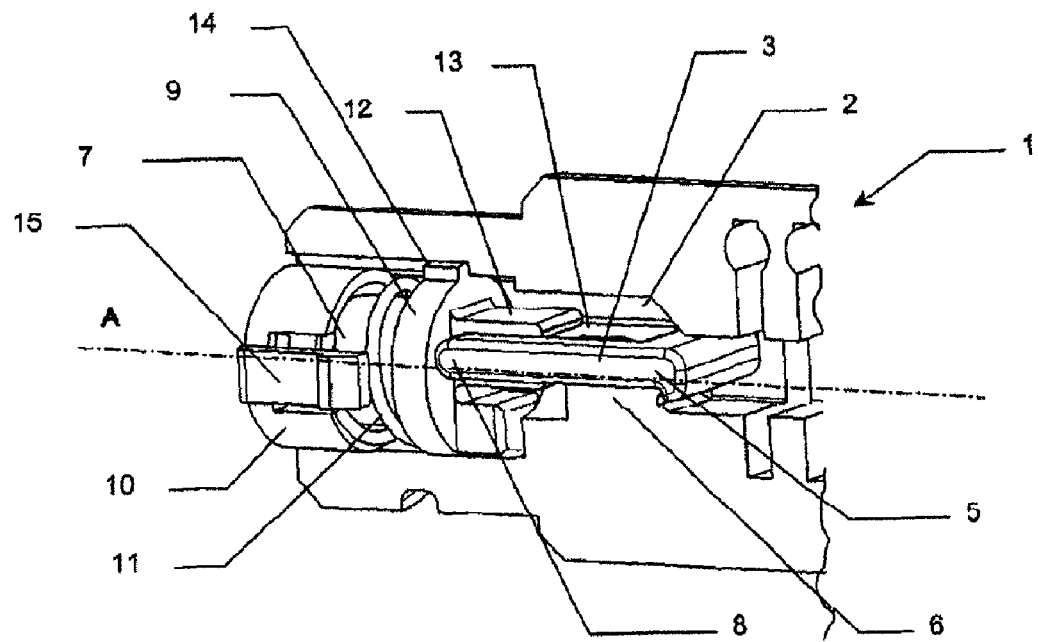
FIG. 3 shows a partial perspective view of a plug according to the invention when the sensor is in the low rest position.

As shown in FIGS. 2 and 3, the sensor 3 is in the low rest position.

The housing 2 comprises a ramp 6 in order to cause the sensor 3 to move into the high position, inclined with respect to the axis A.

The longitudinal slot 13 of said sensor 3 is designed to receive the ramp 6.

The fork 12 of the tripping means 7 prevents the rear end 8 of the sensor from moving translationally in a direction perpendicular to the axis A of introduction of the key, but allows the sensor 3 to be inclined by virtue in particular of the longitudinal slot 13 engaging with the fork 12.

The annular flange 9 of the tripping means 7 abuts against a wall of the housing 2 when the sensor 3 is in the low rest position.

This annular flange 9 has a longitudinal flange 14, as illustrated in FIG. 3, sliding in a groove in the housing 2 in order to prevent the tripping means 7 from rotating about its longitudinal axis.

The assembly formed by the sensor 3, the tripping means 7 and the return means 11 is held inside the housing 2 by means of the cylindrical ring 10.

The cylindrical ring 10 is clipped inside the housing 2 of the plug, at the end of the rear face 17 of the plug, by means of protrusions 15 and stops the tripping means 7 sliding by coming into contact with the annular flange 9 of said tripping means 7.

The tripping means 7 is able to slide inside the cylindrical ring 10 in order to be able to come into contact with the electric switch.

Figure 4:
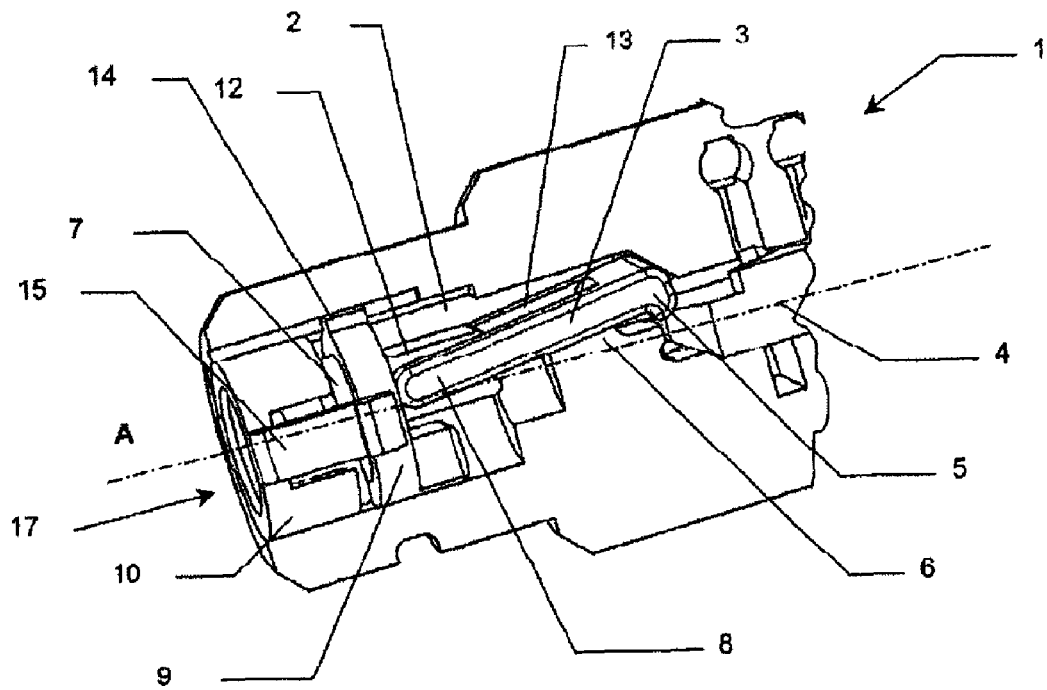
FIG. 4 shows a partial perspective view of a plug according to the invention when the sensor is in the high tripping position.

In FIG. 4, a key 4 has been introduced into the plug 1 via the entry face 16 of the plug.

When the key 4 is introduced into the plug 1, said key engages with the front end 5 of the sensor 3.

The sensor is then slid inside the housing 2, parallel to the axis A of introduction of the key 4, the ramp 6 causing said sensor 3 to move into the high position, inclined with respect to the axis A.

While it slides in the housing 2, the sensor 3 is nested in the fork 12 of the tripping means 7 and is inclined by its rear end 8 rotating.

The rotation of said rear end 8 nested in the fork 12 brings about the engagement of the fork 12 with the longitudinal slot 13 of said sensor 3.

The sensor 3 thus exerts pressure on the tripping means 7 by sliding only parallel to the axis A in the introduction direction of the key 4.

As the tripping means 7 slides in the housing 2, in particular inside the cylindrical ring 10, it compresses the spring 11 between the annular flange 9 of said tripping means 7 and the cylindrical ring 10.

The tripping means 7 slides inside the cylindrical ring 10 until the annular flange 9 of the tripping means 7 is located close to the cylindrical ring 10, in order to trip the electric switch (not shown).

While the key 4 is being withdrawn, the spring 11 returns the tripping means 7 into the position where the annular flange 9 of said tripping means 7 abuts against a part of the housing 2. Thus, the sensor 3 returns to its low rest position.

The sensor 3, the tripping means 7 and the holding means 10 are plastic molded parts.

The plug 1 thus defined forms a single assembly ready to be mounted in a lock shell and in which the sensor 3, the spring 11 and the tripping means 7 are incorporated, the whole being prevented from moving by the cylindrical ring 10.

The present invention is not limited to the embodiment which has just been described and relates generally to all conceivable plugs based on the general indications given in the exposition of the invention.

In another embodiment of the invention, which is not shown, the sensor is returned to its low position by virtue of a control rod of the electric switch having elastic means.

The plug is thus integrated into the lock during its manufacture, as in the prior art document cited above.

The plug housing 2 thus only contains the sensor 3 and the tripping means 7, as described above.

The switch is tripped by way of the tripping means 7 which acts on the control rod of the switch, the elastic means of the switch returning the tripping means 7 into abutment against a part of the housing, defining the return into the low rest position of the sensor 3.

The fork 12 of the tripping means 7 can be replaced by any other means for guiding the rear end 8 of the sensor 3, which is integrated into the housing 2 of the plug 1.

The invention claimed is:

1. A lock plug comprising:
    a longitudinal housing, said housing comprising a control sensor intended to trip an electric switch for detecting the introduction of a key into the lock plug, wherein said control sensor is mounted such that the control sensor slides parallel to the axis (A) of introduction of the key, and
    a front end part of the control sensor, onto which pressure is exerted on by the key, configured to engage with means of the housing that form a ramp in order to cause said front end part to move in a direction inclined with respect to the axis (A) between a low rest position and a high tripping position,
    wherein the housing further comprises:
        a switch-tripping means abutting the rear end of the control sensor, wherein said tripping means is configured to move only parallel to the axis (A), and
        a holding member which is able to hold the switch-tripping means inside said housing.

2. The lock plug as claimed in claim 1, wherein the housing further comprises a return member which is able to return the control sensor to the low rest position when the key is withdrawn from the lock plug.

3. The lock plug as claimed in claim 2, wherein the return member is interposed between an annular flange of the switch-tripping means and the holding member.

4. The lock plug as claimed in claim 1, wherein the holding member is a cylindrical ring forming a bearing for the tripping means.

5. The lock plug as claimed in claim 1, wherein the tripping means comprises a fork preventing the rear end of the control sensor from moving in a direction perpendicular to the axis (A) of introduction of the key.

6. The lock plug as claimed in claim 5, wherein the control sensor comprises a plate-shaped body which comprises a longitudinal slot able to engage with the fork when the sensor is in the high tripping position.

7. An antitheft lock, wherein the antitheft lock comprises a plug as claimed in claim 1.

* * * * *